US012214591B2

(12) United States Patent
Ito

(10) Patent No.: US 12,214,591 B2
(45) Date of Patent: Feb. 4, 2025

(54) LIQUID DISCHARGE APPARATUS, LIQUID DISCHARGE METHOD, MOLDING APPARATUS, AND ARTICLE MANUFACTURING METHOD

(71) Applicant: CANON KABUSHIKI KAISHA, Tokyo (JP)

(72) Inventor: Kosei Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 17/871,822

(22) Filed: Jul. 22, 2022

(65) Prior Publication Data

US 2023/0035868 A1 Feb. 2, 2023

(30) Foreign Application Priority Data

Jul. 30, 2021 (JP) ................................. 2021-125344

(51) Int. Cl.

*B41J 2/045* (2006.01)
*B41J 2/14* (2006.01)
*B41J 2/16* (2006.01)

(52) U.S. Cl.

CPC ....... *B41J 2/04573* (2013.01); *B41J 2/04586* (2013.01); *B41J 2/1433* (2013.01); *B41J 2/162* (2013.01); *B41J 2/1637* (2013.01)

(58) Field of Classification Search

CPC ................ B41J 2/04573; B41J 2/04586; B41J 2/04581; B41J 2/1433; B41J 2/162; B41J 2/1637; B41J 2/04503; B41J 2/2135; B41J 2/07; B41J 11/00214; G03F 7/0002; G03F 7/161

See application file for complete search history.

(56) References Cited

U.S. PATENT DOCUMENTS

2008/0211849 A1* 9/2008 Pierik .................. B41J 2/04586 347/14
2018/0321604 A1 11/2018 Namba

FOREIGN PATENT DOCUMENTS

JP 2011222705 A * 11/2011
JP 5563319 B2 7/2014
JP 2017103313 A 6/2017
JP 2022035649 A 3/2022
TW 202040646 A 11/2020

* cited by examiner

*Primary Examiner* — Jannelle M Lebron

(74) *Attorney, Agent, or Firm* — Canon U.S.A., Inc. I.P. Division

(57) ABSTRACT

A liquid discharge apparatus includes a substrate stage configured to move while holding a substrate, a discharge unit including nozzles for discharging a liquid, a control unit configured to control the discharge unit to discharge the liquid from the discharge unit, and a position acquisition unit configured to acquire a position of a movement target object at a predetermined timing while the substrate stage or the discharge unit is moved as the movement target object. The control unit controls a discharge timing for discharging the liquid from the discharge unit, based on a difference between the position of the movement target object acquired by the position acquisition unit at the predetermined timing and a target position of the movement target object at the predetermined timing.

9 Claims, 6 Drawing Sheets

LIQUID DISCHARGE APPARATUS, LIQUID DISCHARGE METHOD, MOLDING APPARATUS, AND ARTICLE MANUFACTURING METHOD

BACKGROUND

Field of the Disclosure

The present disclosure relates to a liquid discharge apparatus, a liquid discharge method, a molding apparatus, and an article manufacturing method.

Description of the Related Art

With an increasing demand for miniaturization of semiconductor devices and microelectromechanical systems (MEMS), attention has been focused on an imprint technique capable of forming a several-nanometer-order minute pattern (structure) on a substrate, in addition to conventional photolithography techniques. The imprint technique is a fine processing technique that supplies an uncured imprint material onto a substrate (in a supply step) and brings the imprint material and a mold into contact with each other (in a mold pressing step), so that a pattern of the imprint material corresponding to a minute projection and depression pattern formed on the mold is formed on the substrate.

In such a supply step of supplying the imprint material onto the substrate, a discharge apparatus for supplying droplets of the imprint material from nozzles (discharge ports) using an inkjet method can be used. More specifically, a dispenser discharges the imprint material (a liquid) from the discharge ports to arrange the droplets of the imprint material on the substrate while a substrate stage is driven to reciprocate so that a shot region on the substrate faces a discharge port surface of the dispenser.

To accurately form a projection and depression pattern on the substrate, it is desirable to make the droplets of the imprint material land at desired positions. More specifically, it is desirable to keep a landing error of each of the droplets that land in the shot region, within a range of 1 μm to a few μm. If imprint processing is performed in a state where the droplets of the imprint material have landed while the landing error is out of the allowable value range, the imprint material may protrude from the region of the mold in the mold pressing step and the protruding imprint material may become foreign matter. There is also a possibility that the imprint material may spread insufficiently over the surface of the imprint area in the mold pressing step and an unfilled defect may occur.

Japanese Patent No. 5563319 discusses a method of correcting the deviation of a supply position for supplying an imprint material on a substrate, by adjusting the discharge timing of the imprint material based on the position or orientation of a discharge unit (a dispenser).

Meanwhile, to improve the throughput of an imprint apparatus, it has been required to drive the substrate stage at a higher speed and a higher acceleration. It has been found that, when the substrate stage is driven at such a high speed and a high acceleration, a structure of the imprint apparatus may vibrate, and this vibration can affect a dispensing operation. This may possibly cause a misalignment between the substrate and the discharge ports for discharging the imprint material.

With the method discussed in Japanese Patent No. 5563319, the discharge timing can be corrected based on the position or orientation of the discharge unit (the dispenser), but correcting possible vibration may also be advantageous.

SUMMARY

The present disclosure provides embodiments capable of making droplets land at desired positions even if a liquid discharge operation is performed in a state where a substrate stage and a discharge unit are driven to move relative to each other at a high speed and a high acceleration.

According to an aspect of the present disclosure, a liquid discharge apparatus includes a substrate stage configured to move while holding a substrate, a discharge unit including nozzles for discharging a liquid, a control unit configured to control the discharge unit to discharge the liquid from the discharge unit, and a position acquisition unit configured to acquire a position of a movement target object at a predetermined timing while the substrate stage or the discharge unit is moved as the movement target object. The control unit controls a discharge timing for discharging the liquid from the discharge unit, based on a difference between the position of the movement target object acquired by the position acquisition unit at the predetermined timing and a target position of the movement target object at the predetermined timing.

Further features of the present disclosure will become apparent from the following description of exemplary embodiments with reference to the attached drawings.

DESCRIPTION OF THE EMBODIMENTS

Figure 1:
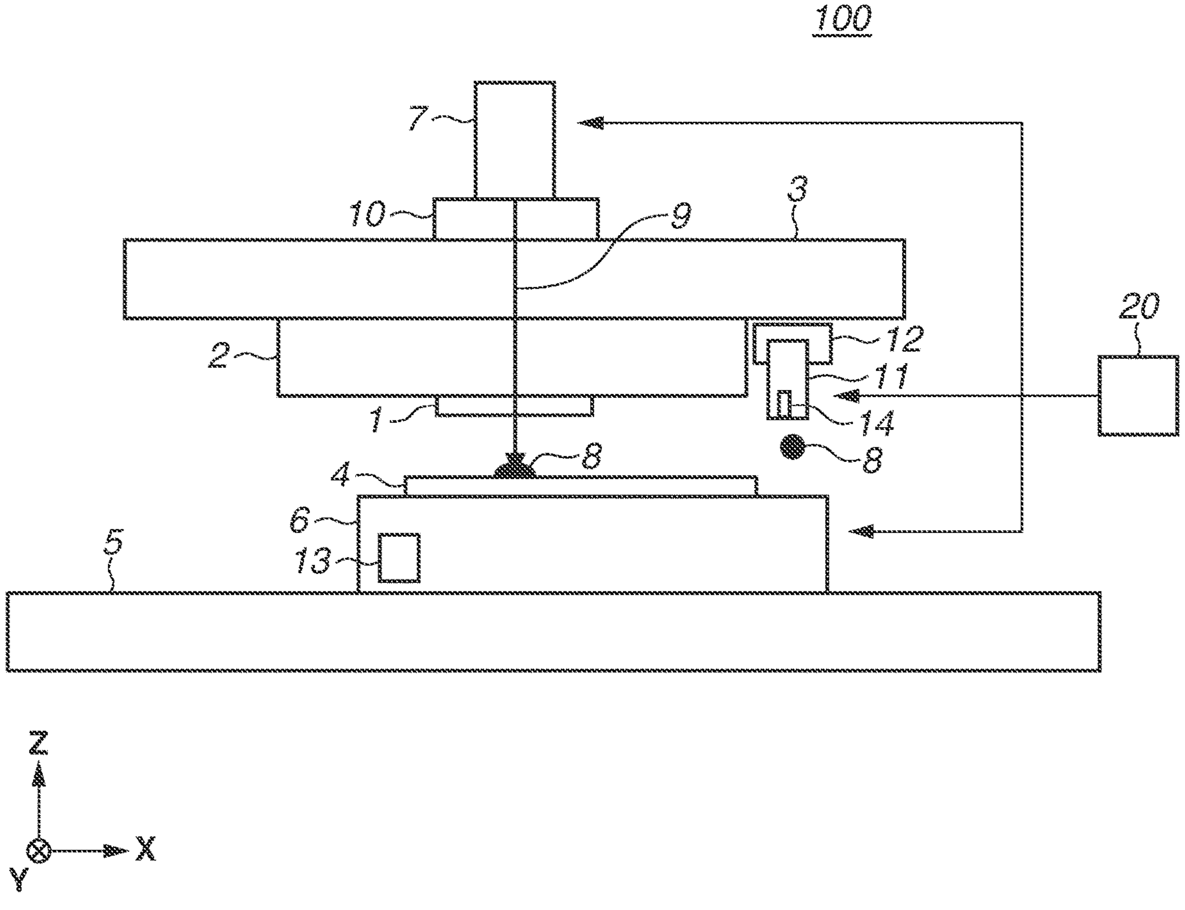
FIG. 1 is a schematic diagram illustrating a configuration of an imprint apparatus.

Exemplary embodiments of the present disclosure will be described below with reference to the attached drawings. In each of the drawings, the same components are denoted by the same reference numerals, and a redundant description thereof will be omitted.

In a first exemplary embodiment of the present disclosure, an imprint apparatus will be described as an example of a molding apparatus. The imprint apparatus according to the present exemplary embodiment is a lithography apparatus that discharges (supplies) an uncured liquid imprint material (a liquid) or ink onto a substrate to form (transfer) a pattern on the substrate. A liquid discharge apparatus according to the present exemplary embodiment is not limited to the imprint apparatus, and is widely applicable to apparatuses each having a droplet discharge mechanism, including industrial equipment such as manufacturing apparatuses for manufacturing semiconductor devices and liquid crystal display devices, and consumer products such as printers.

FIG. 1 is a schematic diagram illustrating a configuration of an imprint apparatus 100 including the liquid discharge apparatus according to the present exemplary embodiment. The imprint apparatus 100 is used to manufacture articles such as semiconductor devices. The imprint apparatus 100 performs molding by bringing an imprint material 8, which is an uncured curable composition applied onto a substrate 4 (an object), and a mold 1 into contact with each other, thereby forming a pattern of the imprint material 8 on the substrate 4. For the imprint apparatus 100, a photo-curing method for curing the imprint material 8 by irradiation of ultraviolet light 9 is adopted as an example. In the following drawings, a Z-axis is the vertical direction, and an X-axis and a Y-axis are directions orthogonal to each other within a plane perpendicular to the Z-axis. The imprint apparatus 100 includes a light irradiation unit 7, a mold holding mechanism 2, a substrate stage 6, a dispenser 11, and a control unit 20. The imprint apparatus 100 illustrated in FIG. 1 also includes a substrate conveyance mechanism (not illustrated) for conveying the substrate 4 to the substrate stage 6.

The imprint apparatus 100 further includes a distance sensor 14 disposed in the dispenser 11 and capable of measuring the distance between the dispenser 11 and the substrate 4, and a position sensor 13 that measures the absolute position of the substrate stage 6. An encoder can be used for the position sensor 13.

The light irradiation unit 7 is a curing unit that adjusts light emitted from a light source (not illustrated) to light (ultraviolet light 9) appropriate to the curing of the imprint material 8, and irradiates the imprint material 8 with the ultraviolet light 9 passing through the mold 1. In the present exemplary embodiment, for example, a mercury lamp that generates an i-line or a g-line can be used as the light source. However, the light source is not limited to the type that emits the ultraviolet light 9, and may be of any type that emits light capable of passing through the mold 1 and having a wavelength for curing the imprint material 8. In a case where a heat-curing method is adopted, for example, a heating unit for curing a curable composition may be disposed near the substrate stage 6 as the curing unit, in place of the light irradiation unit 7.

The mold 1 is rectangular and has a minute projection and depression pattern that is three-dimensionally formed in a central portion of a surface facing the substrate 4. The mold 1 is made of a material, such as quartz, that allows the ultraviolet light 9 to pass through.

The mold holding mechanism (a mold holding unit) 2 is supported by a structure 3, and includes a mold chuck that holds the mold 1 and a mold drive mechanism that supports and moves the mold chuck (which are not illustrated). The mold chuck holds the mold 1 by attracting the outermost area of a surface to be irradiated with the ultraviolet light 9 in the mold 1, by a vacuum suction force or an electrostatic force. The mold drive mechanism moves the mold 1 (the mold chuck) in the Z-axis direction to cause the mold 1 to make contact with or separate from the imprint material 8 on the substrate 4. Alternatively, the contact and separation operations in imprint processing may be implemented by driving the substrate stage 6 to move the substrate 4 in the Z-axis direction, or by moving both of the mold 1 and the substrate 4 relative to each other.

The substrate 4 is a substrate (an object) to be processed and is formed of, for example, single-crystal silicon. If the substrate 4 is used to manufacture articles other than semiconductor devices, for example, optical glass such as quartz can be adopted if the articles are optical elements, and Gallium Nitride (GaN) or Silicon Carbide (SiC) can be adopted if the articles are light emitting elements, as the material of the substrate 4.

The substrate stage (a substrate holding unit) 6 is movable in an XY plane on a stage base 5 while holding the substrate 4, and aligns the mold 1 and the substrate 4 when the mold 1 and the imprint material 8 on the substrate 4 come into contact with each other.

An image capturing unit 10 is configured (disposed) so as to include a pattern area of the mold 1 held by the mold chuck in a field of view, and captures an image of at least one of the mold 1 and the substrate 4 to acquire the captured image. In the imprint processing, the image capturing unit 10 can be used as a camera (a spread camera) for observing the state of contact between the mold 1 and the imprint material 8 on the substrate 4.

The dispenser 11 applies the uncured imprint material 8 (discharges droplets of the imprint material 8) in a desired application pattern, onto a shot region (a pattern formation region) preset on the substrate 4. More specifically, the dispenser 11 includes a plurality of nozzles 31 (refer to 4A) for discharging the imprint material 8 in the uncured state as droplets to apply the imprint material 8 onto the substrate 4. Each of the nozzles 31 has a portion forming a region where ink is present, and a discharge energy generation element that generates discharge energy for discharging the ink present in the region from an opening (a discharge port). By individually driving and controlling the respective discharge energy generation elements, the droplets are discharged from the nozzles 31.

The imprint material 8 is desired to have fluidity when filling the space between the mold 1 and the substrate 4, and to be a solid that maintains a shape after molding. Particularly, in the present exemplary embodiment, the imprint material 8 is an ultraviolet curable resin (a photocurable resin) having a property of being cured by receiving the ultraviolet light 9. However, depending on various conditions for an article manufacturing process and the like, other type of resin such as a thermosetting resin or a thermoplastic resin can be used instead of the photocurable resin.

The control unit 20 can control operations of the components of the imprint apparatus 100, correction, and the like. The control unit 20 is, for example, a computer including a central processing unit (CPU), a read only memory (ROM), and a random access memory (RAM), and various types of arithmetic processing are performed by the CPU. The control unit 20 is connected to the components of the imprint apparatus 100 via a line, and controls the components based on a program stored in the ROM.

The control unit 20 may be configured integrally with the other part of the imprint apparatus 100, or independently of the other part of the imprint apparatus 100. Furthermore, the control unit 20 may include a plurality of computers and an application specific integrated circuit (ASIC) instead of being a single computer.

<Imprint Processing>

Next, the imprint processing for forming a pattern on a substrate using the imprint apparatus 100 and processing the substrate on which the pattern is formed, and an article manufacturing method for manufacturing an article from the processed substrate, will be described with reference to FIGS. 2A to 2F.

Figure 2A:
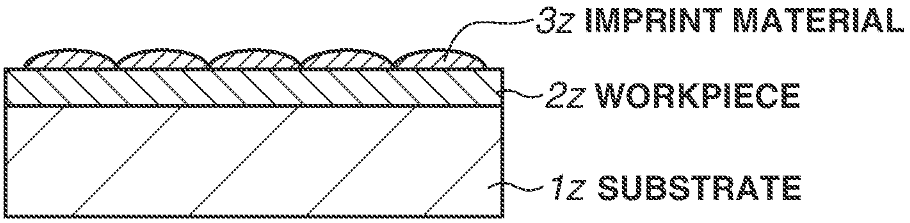
FIGS. 2A to 2F are diagrams illustrating imprint processing performed by the imprint apparatus and an article manufacturing method.

First, as illustrated in FIG. 2A, a substrate 1*z*, such as a silicon wafer, is prepared. The substrate 1*z* has a surface on which a workpiece 2*z*, such as an insulator, is formed. Subsequently, an imprint material 3*z* is discharged to a surface of the workpiece 2*z*. FIG. 2A illustrates a state where the imprint material 3*z* in the shape of a plurality of droplets is applied onto the substrate 1*z*.

At this time, the control unit 20 controls the substrate conveyance mechanism (not illustrated) to place and fix the substrate 4 on the substrate stage 6, and then moves the substrate stage 6 to an application position of the dispenser 11. The control unit 20 then controls the nozzles 31 of the dispenser 11 and the substrate stage 6 to perform a discharge step (an application step) of discharging droplets of the imprint material 8 in a predetermined amount to the substrate 4 while moving the substrate stage 6.

Figure 2B:
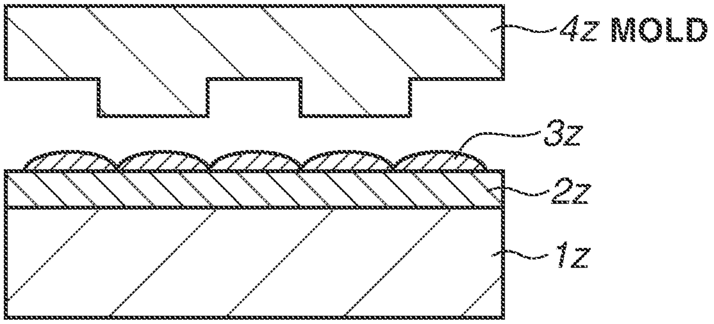

Next, as illustrated in FIG. 2B, a mold 4*z* for imprinting is positioned so that a side of the mold 4*z* on which a projection and depression pattern is formed faces the imprint material 3*z* on the substrate 1*z*. At this time, the control unit 20 moves the substrate 4 so that a portion of the substrate 4 to which the droplets of the imprint material 8 are applied is located at a position facing the projection and depression pattern of the mold 1.

Figure 2C:
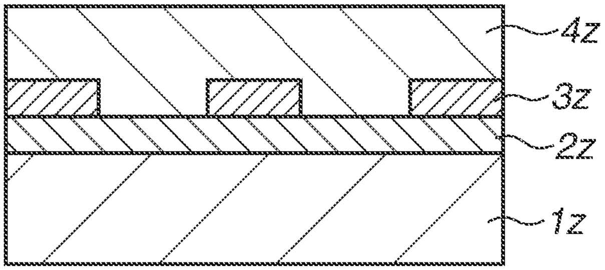

Then, as illustrated in FIG. 2C, the substrate 1*z* to which the imprint material 3*z* is applied and the mold 4*z* are brought into contact with each other and a pressure is applied thereto. The imprint material 3*z* fills the space between the mold 4*z* and the workpiece 2*z*. When the imprint material 3*z* is irradiated with the ultraviolet light 9 as curing energy through the mold 4*z* in this state, the imprint material 3*z* cures.

At this time, to perform the mold pressing step, the control unit 20 drives the mold drive mechanism to bring the mold 1 to a state of being close to the imprint material 8 on the substrate 4. In this state, an alignment scope (not illustrated) detects an alignment mark on the mold 1 and an alignment mark on the substrate 4, and the control unit 20 moves the substrate stage 6 to align the marks based on a result of the detection, thereby adjusting the relative positions of the mold 1 and the substrate 4. Furthermore, the control unit 20 drives the mold drive mechanism to move the mold 1 so as to reduces the distance between the mold 1 and the substrate 4, and brings the imprint material 8 on the substrate 4 and the projection and depression pattern of the mold 1 into contact with each other (which is referred to as a contact step). The imprint material 8 is thereby in tight contact with depressions and projections of the pattern of the mold 1. Furthermore, the control unit 20 drives the light irradiation unit 7 to perform a curing treatment step. The ultraviolet light 9 emitted from the light irradiation unit 7 passes through an optical element and irradiates the top surface of the mold 1. The ultraviolet light 9 irradiating the mold 1 passes through the mold 1, which is optically transparent, and irradiates the imprint material 8, so that the imprint material 8 cures (which is referred to as a curing step).

Figure 2D:
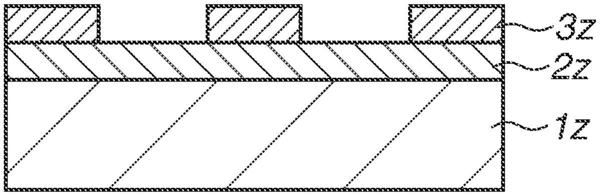

Then, as illustrated in FIG. 2D, when the mold 4*z* and the substrate 1*z* are separated from each other after the imprint material 3*z* is cured, a pattern of a cured material of the imprint material 3*z* is formed on the substrate 1*z* (which is referred to as a mold release step). The shape of the pattern of the cured material is such that the depressions of the mold 1 correspond to projections of the cured material and the projections of the mold 1 correspond to depressions of the cured material. In other words, the projection and depression pattern of the mold 4*z* is transferred to the imprint material 3*z*.

At this time, the control unit 20 drives the mold drive mechanism to raise the mold chuck, thereby performing a separation step of separating the mold 1 from the cured imprint material 8. This completes the imprint processing by the imprint apparatus 100. The substrate 4 for which the imprint processing is completed is conveyed from the substrate stage 6 by the substrate conveyance mechanism (not illustrated).

Figure 2E:
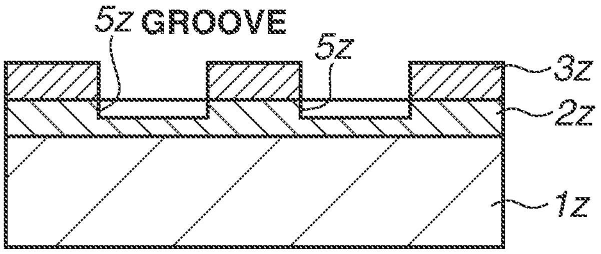
Figure 2F:
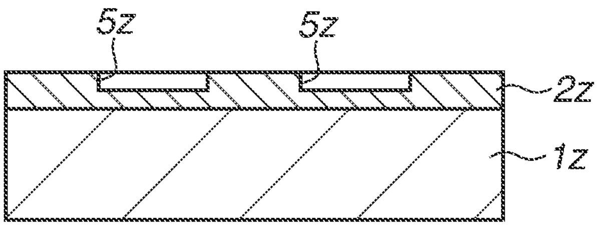

As illustrated in FIG. 2E, the substrate 4 for which the imprint processing is completed is subjected to etching using the pattern of the cured material as an etching-resistant mask, so that a portion, in the surface of the workpiece 2*z*, where the cured material is not present or the cured material remains as a thin layer is removed, and grooves 5*z* are thereby formed. As illustrated in FIG. 2F, after the pattern of the cured material is removed, an article in which the grooves 5*z* are formed in the surface of the workpiece 2*z* can be obtained. In the present exemplary embodiment, the pattern of the cured material is removed, but may be used, for example, as an inter-layer insulation film included in a semiconductor device, i.e., as a component of the article, without being removed after the processing.

The article manufacturing method according to the present exemplary embodiment includes the step of forming a pattern on the imprint material 3*z* supplied (applied) to the substrate 1*z* by using the imprint apparatus 100 (the above-described imprinting method), and the step of processing the substrate 1*z* on which the pattern is formed. The article manufacturing method further includes other known steps (such as oxidation, film formation, vapor deposition, doping, flattening, etching, resist separation, dicing, bonding, and packaging).

Figure 3:
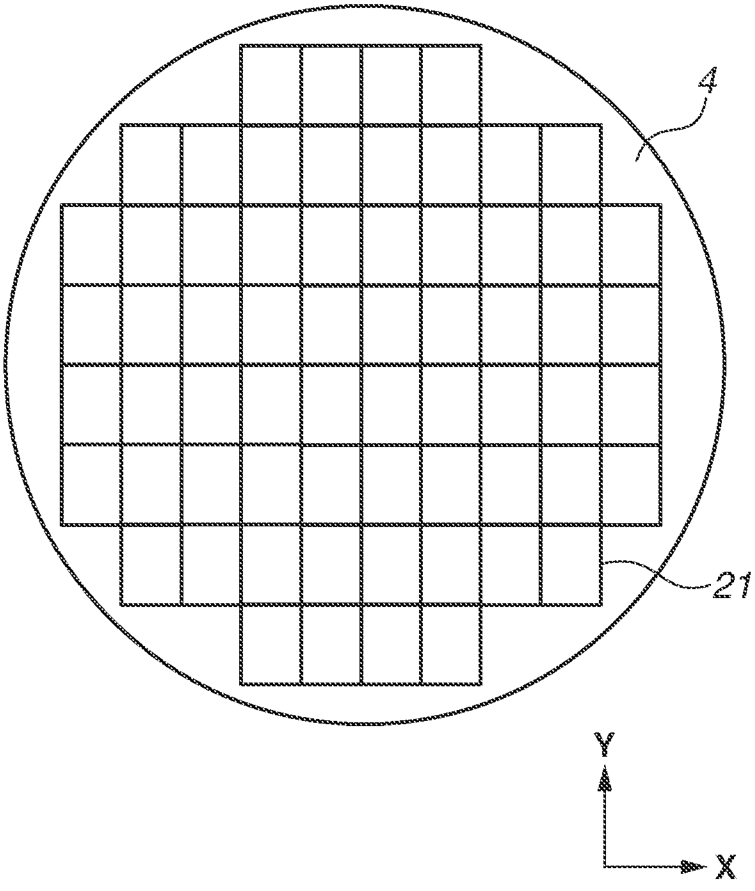
FIG. 3 is a diagram illustrating a plurality of shot regions of a substrate.

Next, the application step according to the present exemplary embodiment will be described in more detail. As illustrated in FIG. 3, a plurality of rectangular shot regions 21 is set at a predetermined position on the substrate 4. For the plurality of shot regions 21, the imprint apparatus 100 sequentially performs the application step, the contact step, the curing step, and the mold release step. The imprint apparatus 100 repeats the processes for each of the shot regions 21, so that the imprint processing on the substrate 4 is completed.

In the application step, the substrate stage 6 is driven to bring the target shot region 21 to be processed, to a position facing the nozzles 31, and at the same time, the imprint material 8 is discharged from the nozzles 31, so that the imprint material 8 can be applied to the desired shot region 21.

Figure 4A:
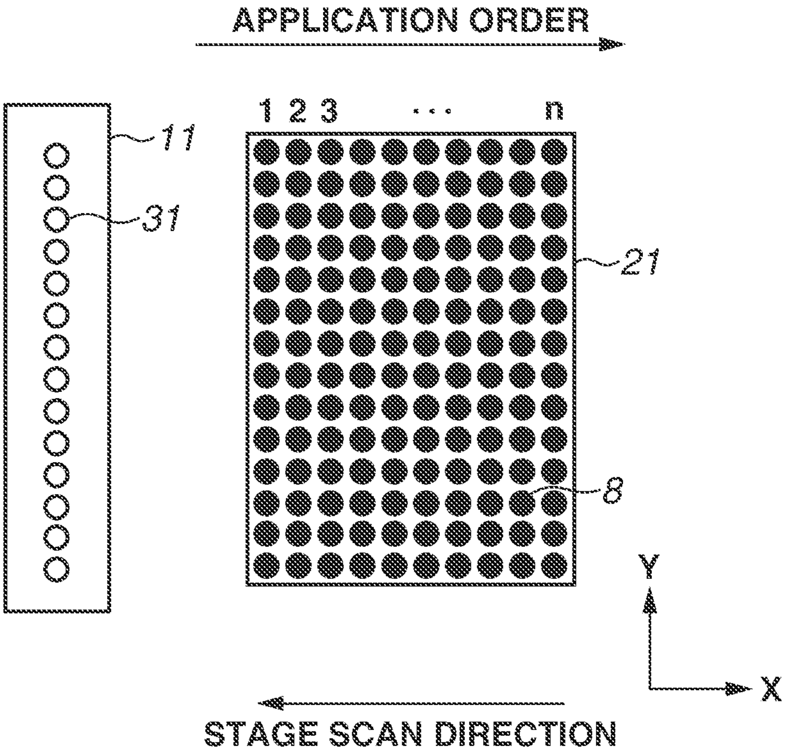
FIG. 4A is a diagram illustrating a state where droplets of an imprint material have landed in a shot region of the substrate according to the first exemplary embodiment.

FIG. 4A illustrates a state where droplets of the imprint material 8 are discharged onto the target shot region 21. FIG. 4A illustrates, as an example, a simple state where the imprint material 8 is discharged ten times (n=10) at predetermined time intervals, using the dispenser 11 including the fourteen nozzles 31 arranged in a line in the Y direction, while the substrate stage 6 is driven in the −X direction. In other words, FIG. 4A illustrates a state where droplets in n-lines (1st, 2nd, 3rd, . . . , and n-th lines) are discharged onto the substrate 4.

Actually, for example, the imprint apparatus 100 discharges the imprint material 8 hundreds of times using the dispenser 11 including hundreds of nozzles arranged in a line, while driving the substrate stage 6 to reciprocate. In other words, the imprint material 8 in an array with hundreds of droplets in the X direction and hundreds of droplets in the Y direction is applied to the target shot region 21.

To form an accurate pattern on the target shot region 21, a landing error of each droplet of the imprint material 8 in the target shot region 21 is to be kept within a range of 1 μm to a few μm. In a case where the landing error is out of such an allowable range, there is a possibility that the imprint material 8 may protrude from the mold 1 during the mold pressing step to produce foreign matter, or the imprint material 8 may spread insufficiently over the surface of the target shot region 21 to cause an unfilled defect.

Meanwhile, the substrate stage 6 is driven at a high speed and a high acceleration in order to improve the throughput of the imprint apparatus 100. When the substrate stage 6 is moved at such a high speed and a high acceleration, the structure of the imprint apparatus 100 including the dispenser 11 vibrates, so that a misalignment between the discharge unit of the dispenser 11 and the target shot region 21 of the substrate 4 occurs.

Particularly, it is known that, in a case where the substrate stage 6 is driven in the X-axis direction (a moving direction), large vibrations of the structure in the X-axis direction occur. When droplets of the imprint material 8 are discharged from the dispenser 11 in such a state, the imprint material 8 is discharged while the substrate stage 6 is deviated from a target position. This causes the landing error of each droplet in the X-axis direction in the 1st, the 2nd, the 3rd, . . . , and the n-th lines.

To prevent the occurrence of foreign matter or an unfilled defect due to the deviation of the droplet landing position as described above, control for reducing such a deviation from the target landing position is desired. In the present exemplary embodiment, a positional deviation amount of the substrate stage 6 at a predetermined timing is calculated in advance, and a discharge timing in the imprint processing is controlled based on the result of the calculation, so that the landing position is corrected.

Figure 5:
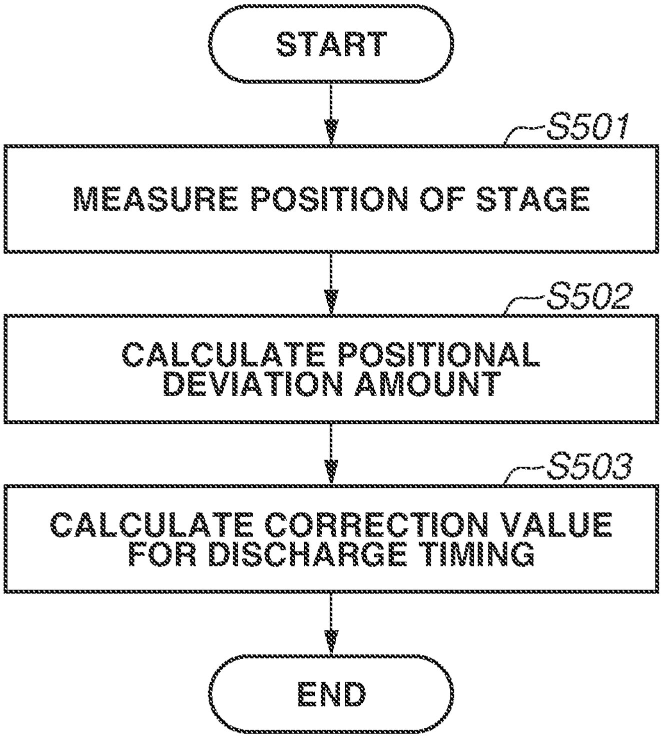
FIG. 5 is a flowchart illustrating a discharge timing correction method according to a first exemplary embodiment.

Processing for correcting the landing position will be described with reference to a flowchart illustrated in FIG. 5. The processing for correcting the landing position can be performed at a timing different from the actual timing for performing the imprint processing. The processing in the flowchart illustrated in FIG. 5 is implemented by the control unit 20 controlling the components of the imprint apparatus 100.

In step S501, the control unit 20 controls the driving of the substrate stage 6 so that the target shot region 21 of the substrate 4 on the substrate stage 6 is at a position directly below the nozzles 31 of the dispenser 11, as in the imprint processing. Then, while moving the substrate stage 6 at a fixed target speed, the control unit 20 acquires information about the positions of the substrate stage 6 at predetermined timings at fixed intervals corresponding to discharge timings, using the position sensor 13. At this time, the imprint material 8 may not necessarily be discharged from the dispenser 11.

Figure 4B:
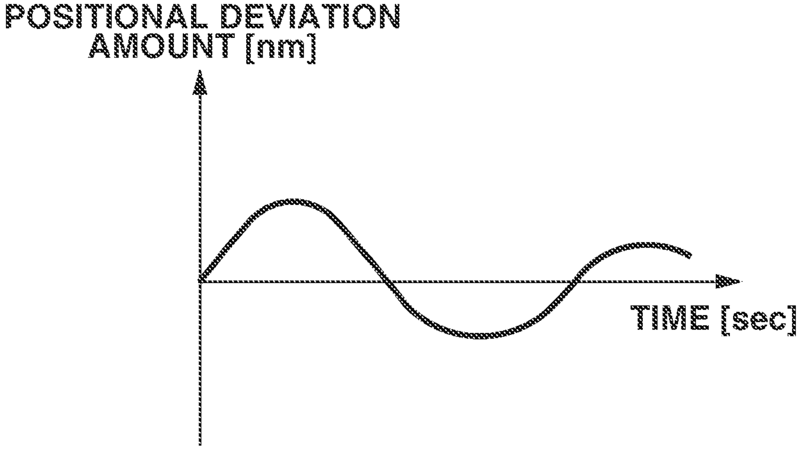
FIG. 4B is a schematic diagram illustrating a positional deviation amount of a substrate stage.

In step S502, the control unit 20 calculates the difference (the positional deviation amount) between the position of the substrate stage 6 at each predetermined timing acquired in step S501 and the target position of the substrate stage 6 at the predetermined timing. FIG. 4B is a graph where the positional deviation amount is plotted. It is apparent that, even if the substrate stage 6 is controlled to move at the fixed target speed as described above, the substrate stage 6 is deviated from the target position due to the vibrations caused by the acceleration and deceleration of the substrate stage 6. It is found that, if droplets are discharged from the dispenser 11 in such a state where the position of the substrate stage 6 is deviated, a landing position deviation amount that is approximately the same as the positional deviation amount of the substrate stage 6 illustrated FIG. 4B occurs. Thus, the discharge timing is shifted by the amount corresponding to the deviation amount obtained using the position sensor 13 of the substrate stage 6 at the same timing, so that droplets can be landed at desired landing positions.

In other words, in step S503, the control unit 20 calculates the correction amount for correcting each discharge timing during the movement of the dispenser 11, using the positional deviation amount at each predetermined timing during the driving of the substrate stage 6 calculated in step S502. Such a correction amount is then stored into a storage unit, as correction information about the discharge timing. The correction value for correcting each discharge timing may be calculated at each timing of the imprint processing, but it takes time to acquire the result, and thus it is desirable to calculate the correction value each time the wafer is replaced, when the substrate stage 6 or the dispenser 11 is replaced, or when maintenance is performed.

In the discharge step of the imprint processing, the control unit 20 refers to the correction amount information stored in the storage unit, and controls the discharge operation to be performed at the corrected desired discharge timing, so that the landing position of each droplet can be corrected to be the most suitable position. In other words, it is possible to suppress or prevent the obstruction of satisfactory pattern formation on the substrate 4.

The correction of each discharge timing may be implemented by rewriting the discharge target coordinates before correction, or by changing the frequency of the operation clock of the control unit 20 controlling the discharge timing, based on the deviation amount. In a case where the discharge is performed for the plurality of shot regions 21 on the substrate 4, it is conceivable that the values to be corrected vary because conditions for relative movements between the dispenser 11 and the substrate stage 6 differ. Thus, it is conceivable to adopt a method in which the values to be corrected are measured and stored for each of the shot regions 21, and, in the actual discharge operation, the correction values for the corresponding shot region 21 are read and each discharge timing is changed based on the correction values. Furthermore, the array of the imprint material 8 to be discharged onto the substrate 4 can be changed depending on imprinting conditions, and thus, it is desirable to acquire the correction value for each discharge timing, with accuracy of at least one-tenth or less of the smallest grid of the imprint material 8 to be arrayed on the substrate 4.

The positional deviation amount at each predetermined timing during the driving of the substrate stage 6 may be acquired using the image capturing unit 10 instead of using the position sensor 13. More specifically, an image of droplets of the imprint material 8 discharged at fixed time intervals while the substrate stage 6 is moved at the fixed target speed is acquired as image information, and the landing position of each droplet on the substrate 4 obtained by image processing on the acquired image is acquired. This makes it possible to determine the position of the substrate stage 6 at each predetermined timing during the driving of the substrate stage 6, and the amount of positional deviation from the landing target position. The amount of deviation from the landing target position may be determined by measuring a positional relationship with a mark formed on the substrate 4 in advance by a semiconductor process, at each of several points.

While in the present exemplary embodiment, the example of dispensing while moving the substrate stage 6 has been described, the imprint material 8 may be applied onto the substrate 4 on the substrate stage 6 by driving the dispenser 11 provided with a position sensor. The position sensor functioning as a position acquisition unit in this case acquires the positions of the dispenser 11 at fixed time intervals, and determines the positional deviation amount based on each of the acquired positions. In other words, in the present exemplary embodiment, the substrate 4 on the substrate stage 6 and the dispenser 11 are movable relative to each other, and the position acquisition unit acquires the positions of the movement target object.

Modified Example

A modified example of the first exemplary embodiment will be described. In the first exemplary embodiment, each discharge timing is adjusted based on the positional deviation amount determined using the position sensor 13. To make more precise adjustment, the distance between the dispenser 11 and the substrate 4 moving relative to each other may be adjusted based on a value of the distance sensor 14 (a distance acquisition unit) in addition to the value of the position sensor 13.

As illustrated in FIG. 1, the distance sensor 14 can measure a desired distance by being mounted on the dispenser 11. In a case where it is difficult to mount the distance sensor 14 on the dispenser 11, the distance sensor 14 may be mounted on a dispenser holding unit 12 holding the dispenser 11. In the present modified example, a part different from the first exemplary embodiment will be mainly described, and the description of a similar part will be omitted.

In the present modification example, in step S501 of FIG. 5, the position sensor 13 measures the position of the substrate stage 6 at each predetermined timing, and the distance sensor 14 measures the distance between the dispenser 11 and the substrate 4 at the same timing as the predetermined timing.

In step S502, the deviation amount in the array of the imprint material 8 on the substrate 4 is calculated based on the measured value of each of the distance sensor 14 and the position sensor 13 moving relative to each other.

Such calculation of the deviation amount will be concretely described. A displacement amount appearing in the distance sensor 14 affects the time taken for the discharged imprint material 8 to land on the substrate 4.

Thus, a change amount X [μm] at the landing position can be calculated by the following formula (1).

$$X\ [\mu m] = \text{Zerror}\ [\mu m] \times V\text{stage}\ [m/sec] / V\text{drop}\ [m/sec] \quad (1)$$

where Vstage [m/sec] is the moving speed of the substrate stage 6, Vdrop [m/sec] is the speed of the discharged imprint material 8, and Zerror [μm] is the difference between the value of the distance sensor 14 at a certain timing during the discharge and the value of the distance sensor 14 in a stationary state.

In step S503, the control unit 20 calculates the timing correction amount for correcting each discharge timing during the movement of the dispenser 11, using the change amount X at each predetermined timing during the driving of the substrate stage 6.

Such a correction amount is then stored into the storage unit, as information for performing discharge at the discharge timing.

In the discharge step of the imprint processing, the control unit 20 refers to the correction amount information stored in the storage unit, and controls the discharge operation to be performed at the corrected desired discharge timing, so that the landing position of each droplet can be corrected to be the most suitable position. In other words, it is possible to suppress or prevent the obstruction of satisfactory pattern formation on the substrate 4.

In the first exemplary embodiment, in a case where each discharge timing is corrected, the position of the substrate stage 6 is to be measured at the corresponding position. In a second exemplary embodiment, a configuration where each discharge timing can be corrected in a way different from the correction based on the position at which the position of the substrate stage 6 is measured will be described. In the present exemplary embodiment, a part different from the first exemplary embodiment will be mainly described, and the description of a similar part will be omitted.

The speed of the substrate stage 6 during dispensing is desirably constant in order to reduce an error in the array of the imprint material 8. However, to improve the throughput, the substrate stage 6 is moved at a speed higher than the speed in dispensing, in a region other than a dispensing region, and then dispensing is performed immediately after the substrate stage 6 is decelerated, so that productivity can be enhanced. In addition, when the dispensing is reciprocally performed, in order to eliminate unnecessary run of the substrate stage 6, the substrate stage 6 is accelerated immediately after being turned back and the dispensing is started when a target speed is reached, and thus, the dispensing is performed immediately after the acceleration.

In this way, the amount of positional deviation of the substrate stage 6 from the target position immediately after the deceleration or immediately after the acceleration is dominantly due to deformation of the substrate stage 6, and a change in this positional deviation amount has a damped oscillation component as illustrated in FIG. 4B. This damped oscillation varies among the shot regions 21 on the substrate 4, but the relationship in terms of the damped oscillation among the shot regions 21 can be calculated by considering the positional relationship between the center of gravity of the substrate stage 6 and the center of each of the shot regions 21. In other words, if the positional deviation amount is measured for one or more of the shot regions 21 on the substrate 4, the correction value for each discharge timing can also be similarly calculated for the other shot regions 21, and can be used for the correction of the landing position.

Figure 6:
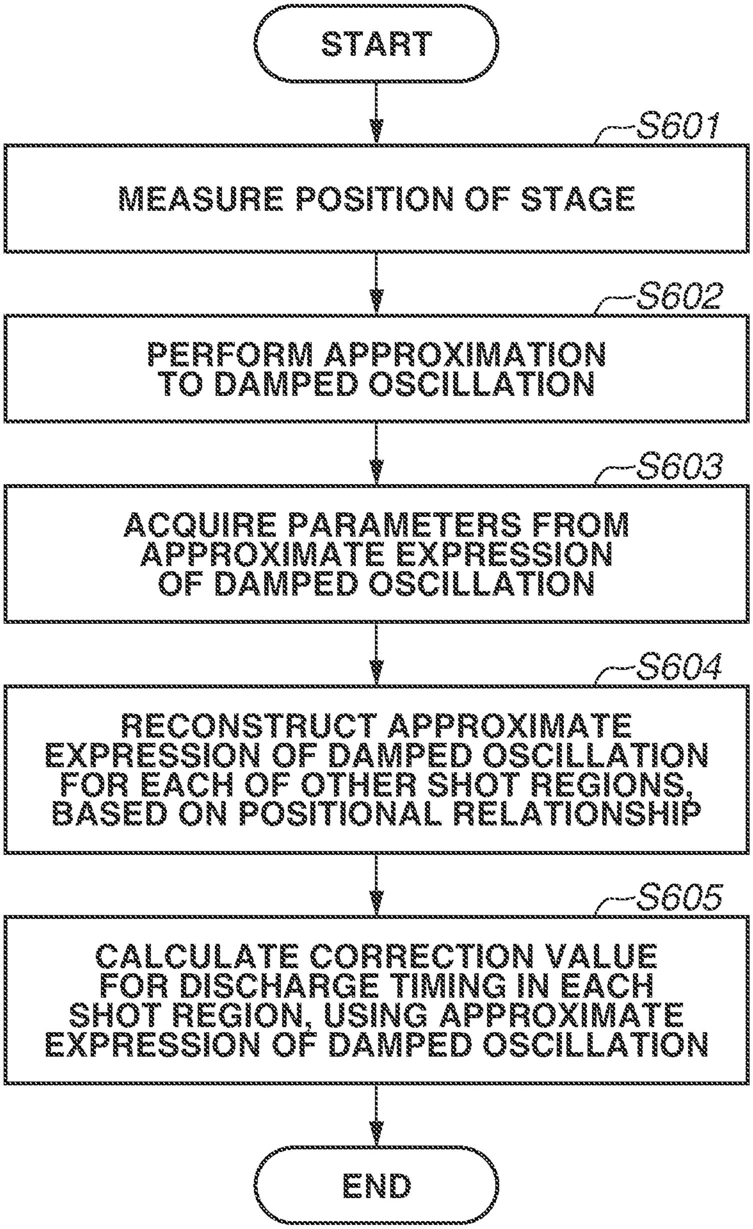
FIG. 6 is a flowchart illustrating a discharge timing correction method according to a second exemplary embodiment.

Processing for such calculation of the correction value for correcting the landing position will be described with reference to a flowchart in FIG. 6. The processing illustrated in the flowchart in FIG. 6 is implemented by the control unit 20 controlling the components of the imprint apparatus 100.

In step S601, the control unit 20 controls the driving of the substrate stage 6 so that the target shot regions 21 of the substrate 4 on the substrate stage 6 is at a position directly below the nozzles 31 of the dispenser 11, as in the imprint processing. Then, while moving the substrate stage 6 at a fixed target speed, the control unit 20 acquires the positions of the substrate stage 6 at predetermined timings at fixed intervals, using the position sensor 13. At this time, the imprint material 8 may not necessarily be discharged from the dispenser 11. In addition, as the target shot region 21 is closer to the center of the substrate stage 6, an error component is expected to be less in calculating the correction values for the other shot regions 21.

In step S602, the control unit 20 calculates the difference (the positional deviation amount) between the position of the substrate stage 6 at each predetermined timing acquired in step S601 and the target position of the substrate stage 6 at the predetermined timing, and approximates the calculated difference to an expression of a damped oscillation wave.

In step S603, the control unit 20 acquires parameters, such as a phase, an amplitude, a damping factor, and a frequency component, from the approximate expression of the damped oscillation obtained by the approximation in step S604.

In step S604, the control unit 20 corrects each of the parameters acquired in step S603, considering the positional relationship with the target shot region 21 subjected to the position measurement in step S601, and reconstructs the approximate expression of the damped oscillation for each of the other shot regions 21. Processing in steps S601 and S602 may be performed on a plurality of the target shot regions 21 within the plane of the wafer, and the approximate expression of the damped oscillation may be reconstructed for any other shot region 21 not subjected to the position measurement, using each parameter acquired for the plurality of target shot regions 21.

In step S605, the control unit 20 calculates the correction amount for correcting each discharge timing during the movement of the dispenser 11 for each of the shot regions 21, using the approximate expression of the damped oscillation obtained by the approximation in step S602, or the approximate expression of the damped oscillation reconstructed in step S604. Using the approximate expression of the damped oscillation for the calculation of the correction amount makes it possible to correct each discharge timing in a way different from the correction based on the position at which the position of the substrate stage 6 is measured. In addition, using the reconstructed approximate expression of the damped oscillation makes it possible to correct the positional deviation amount for each of the shot regions 21 without performing measurement for all the shot regions 21. Such a correction amount is then stored into the storage unit, as correction information for the discharge timing.

In the discharge step of the imprint processing, the control unit 20 refers to the correction amount information stored in the storage unit, and controls the discharge operation to be performed at the corrected desired discharge timing, so that the landing position of each droplet can be corrected to be the most suitable position. In other words, it is possible to suppress or prevent the obstruction of satisfactory pattern formation on the substrate 4. Alternatively, the position measurement of the substrate stage 6 may be performed for each of the shot regions 21 and the correction may be performed using the approximate expression of the damped oscillation for each of the shot regions 21 without performing the reconstruction in step S603.

In the above-described exemplary embodiments, the imprint apparatus (the molding apparatus) 100 including the liquid discharge apparatus has been described. In another exemplary embodiment, a liquid discharge apparatus to which any of the exemplary embodiments of the present disclosure is applied may be provided separately from an imprint apparatus, and the imprint apparatus may perform imprint processing on a substrate onto which an imprint material is applied.

Furthermore, each of the exemplary embodiments of the present disclosure can be applied to a flattening apparatus (a molding apparatus for flattening) that cures a member (a flattening member) having no pattern in a state of being in contact with a curable composition to provide a flattening layer of a cured material of the curable composition on a substrate.

According to the exemplary embodiments of the present disclosure, it is possible to provide a configuration where droplets of a liquid can be landed at desired positions even if an operation to discharge the liquid to a substrate is performed in a state where a substrate stage and a discharge unit are driven to move relative to each other at a high speed and a high acceleration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-125344, filed Jul. 30, 2021, which is hereby incorporated by reference herein in its entirety.

What is claimed is:

1. A liquid discharge apparatus comprising:

a substrate stage configured to move while holding a substrate;

a discharge unit including a nozzle for discharging a liquid;

a control unit configured to control the discharge unit to discharge the liquid from the discharge unit; and a position acquisition unit configured to acquire a position of a movement target object at a predetermined timing while the substrate stage or the discharge unit is moved as the movement target object, wherein the control unit controls a discharge timing for discharging the liquid from the discharge unit, based on an approximate expression relating to damping vibration of the movement target object obtained from a difference between the position of the movement target object acquired by the position acquisition unit at the predetermined timing and a target position of the movement target object at the predetermined timing.

2. The liquid discharge apparatus according to claim 1, wherein the difference is a deviation amount of the movement target object in a moving direction thereof.

3. The liquid discharge apparatus according to claim 1, further comprising a distance acquisition unit configured to acquire a distance between the discharge unit and the substrate on the substrate stage, wherein the control unit controls the discharge timing for discharging the liquid from the discharge unit, based on the position acquired in advance at a timing by the position acquisition unit while the movement target object is moved, and the distance acquired by the distance acquisition unit at a same timing as the timing.

4. The liquid discharge apparatus according to claim 1, wherein the position acquisition unit is an image capturing unit, and wherein the liquid is discharged from the discharge unit to the substrate on the substrate stage while the movement target object is moved at a fixed target speed, an image of droplets of the liquid on the substrate is captured by the image capturing unit, and the position is acquired from the captured image.

5. The liquid discharge apparatus according to claim 1, wherein the control unit stores information for discharging the liquid at a discharge timing determined based on the position, and controls the discharge timing for discharging the liquid from the discharge unit, based on the stored information.

6. The liquid discharge apparatus according to claim 1, wherein a plurality of shot regions is set on the substrate held by the substrate stage, and wherein, based on the difference calculated for each of the plurality of shot regions, the control unit controls the discharge timing for each of the plurality of shot regions.

7. A molding apparatus comprising:

the liquid discharge apparatus according to claim 1;

a mold holding unit configured to hold a mold; and a curing unit configured to cure a curable composition, wherein the liquid discharged from the discharge unit is the curable composition, and wherein the control unit controls the curing unit to cure the curable composition in a state where the substrate and the mold are in contact with each other with the curable composition interposed therebetween.

8. An article manufacturing method comprising:

forming a film on the substrate using the molding apparatus according to claim 7;

processing the substrate on which the film is formed; and manufacturing an article from the processed substrate.

9. A liquid discharge method comprising:

acquiring a position of a movement target object at a predetermined timing while a substrate stage holding a substrate or a discharge unit including nozzles for discharging a liquid is moved as the movement target object; and controlling a discharge timing for discharging the liquid from the discharge unit, based on an approximate expression relating to damping vibration of the movement target object obtained from a difference between the acquired position of the movement target object and a target position of the movement target object at the predetermined timing.

* * * * *